United States Patent
Korten et al.

(10) Patent No.: US 12,337,536 B2
(45) Date of Patent: Jun. 24, 2025

(54) METHOD OF TIME-SHIFTED AND TIME-OVERLAPPING BUILDING UP PHYSICAL WORKPIECES BY ADDITIVE MANUFACTURING

(71) Applicant: SOLVENTUM INTELLECTUAL PROPERTIES COMPANY, Maplewood, MN (US)

(72) Inventors: Malte Korten, Moorenweis (DE); Gioacchino Raia, Türkenfeld (DE); Adrian S. Eckert, Herrsching (DE); Helmar B. Mayr, Kaufering (DE); Dietmar Blees, Löhne (DE)

(73) Assignee: Solventum Intellectual Properties Company, Maplewood, MN (US)

(*) Notice: Subject to any disclaimer, the term of this patent is extended or adjusted under 35 U.S.C. 154(b) by 462 days.

(21) Appl. No.: 17/250,254

(22) PCT Filed: Jun. 26, 2019

(86) PCT No.: PCT/IB2019/055398
§ 371 (c)(1),
(2) Date: Dec. 22, 2020

(87) PCT Pub. No.: WO2020/003156
PCT Pub. Date: Jan. 2, 2020

(65) Prior Publication Data
US 2021/0268730 A1    Sep. 2, 2021

(30) Foreign Application Priority Data
Jun. 29, 2018    (EP) ..................... 18180660

(51) Int. Cl.
*B29C 64/182*    (2017.01)
*B29C 64/135*    (2017.01)
(Continued)

(52) U.S. Cl.
CPC .......... *B29C 64/182* (2017.08); *B29C 64/135* (2017.08); *B29C 64/386* (2017.08);
(Continued)

(58) Field of Classification Search
CPC ... B29C 64/182; B29C 64/386; B29C 64/135; B33Y 30/00; B33Y 10/00; B33Y 50/00; B29K 2033/08; B29K 2105/0032
See application file for complete search history.

(56) References Cited

U.S. PATENT DOCUMENTS 8,845,319 B2    9/2014 Oberhofer
2005/0263932 A1    12/2005 Heugel
(Continued)

FOREIGN PATENT DOCUMENTS

CN    103978212    8/2014
CN    105196549    12/2015
(Continued)

OTHER PUBLICATIONS

International Search Report for PCT International Application No. PCT/IB2019/055398, mailed on Jan. 28, 2020, 8 pages.

*Primary Examiner* — Larry W Thrower (57) ABSTRACT

A method of building up at least a first (10) and a second (20) physical workpiece from a light hardenable material (105) on a 3D printing device (100). The method has the steps of providing to the 3D printing device a first dataset for building up a first workpiece; starting a first print job based on the first dataset; providing to the same 3D printing device a second dataset for building up a second workpiece after the start the first print job; and starting a second print job based on the second dataset before finishing the first print job.

17 Claims, 6 Drawing Sheets

(51) Int. Cl.
   *B29C 64/386*     (2017.01)
   *B33Y 10/00*      (2015.01)
   *B33Y 30/00*      (2015.01)
   *B33Y 50/00*      (2015.01)
   *B29K 33/00*      (2006.01)
   *B29K 105/00*     (2006.01)

(52) U.S. Cl.
   CPC ............... *B33Y 10/00* (2014.12); *B33Y 30/00* (2014.12); *B33Y 50/00* (2014.12); *B29K 2033/08* (2013.01); *B29K 2105/0032* (2013.01)

(56) References Cited

U.S. PATENT DOCUMENTS

| | | | |
|---|---|---|---|
| 2014/0044824 A1* | 2/2014 | Rohner | B33Y 30/00 425/174.4 |
| 2014/0050588 A1 | 2/2014 | Schmitt | |
| 2017/0071707 A1 | 3/2017 | Uckelmann | |
| 2017/0165916 A1* | 6/2017 | Ali | B29C 64/124 |
| 2017/0266890 A1 | 9/2017 | Volk | |
| 2018/0126668 A1 | 5/2018 | El-Siblani | |

FOREIGN PATENT DOCUMENTS

| | | |
|---|---|---|
| CN | 106363906 | 2/2017 |
| CN | 107538737 | 1/2018 |
| DE | 102016212571 | 1/2018 |
| EP | 2914411 | 9/2015 |
| WO | WO 2014-070007 | 5/2014 |
| WO | WO 2014-079404 | 5/2014 |
| WO | WO 2015-152744 | 10/2015 |
| WO | WO 2017-100538 | 6/2017 |
| WO | WO 2017-106082 | 6/2017 |
| WO | WO 2018-026640 | 2/2018 |

\* cited by examiner

METHOD OF TIME-SHIFTED AND TIME-OVERLAPPING BUILDING UP PHYSICAL WORKPIECES BY ADDITIVE MANUFACTURING

CROSS REFERENCE TO RELATED APPLICATIONS

This application is a national stage filing under 35 U.S.C. 371 of PCT/IB2019/055398, filed Jun. 26, 2019, which claims the benefit of European Application No. 18180660.5, filed Jun. 29, 2018, the disclosure of which is incorporated by reference in its/their entirety herein.

FIELD OF THE INVENTION

The invention relates to a method of building up at least a first and a second physical workpiece from a light hardenable material on a 3D printing device. In particular the invention relates to starting a second print job for printing the second workpiece after the start and before finishing a first print job for printing the first workpiece.

BACKGROUND ART

In a variety of technical fields physical objects or mechanical workpieces are more and more manufactured by additive manufacturing processes.

Such additive manufacturing processes typically allow for building up an object in its desired individual shape, by subsequently adding material to create that shape. So-called subtractive processes in which an object is machined from an oversized blank by removal of material are more and more replaced by additive manufacturing processes.

While additive manufacturing processes are meanwhile widely used in the industry for rapid prototyping, the manufacturing of final products in many areas is still challenging. In particular for making dental restorations it is generally required to use materials that are compatible for use in a human body. Further, a dental restoration manufactured by a build-up process must fulfill requirements to mechanical stability as well as expectations about aesthetics, for example concerning color shading and translucency.

Some additive manufacturing processes are based on Stereolithography. Stereolithography generally uses light for hardening light hardenable or photopolymerizable resins. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired outer shape of the three-dimensional object.

Often additive manufacturing processes and corresponding devices are based on a batchwise operation. In particular many existing additive manufacturing processes and devices are not configured for building up two or more workpieces in a time-shifted and time-overlapping manner, but require that a workpiece is finished before the next workpiece can be built up on the same device.

WO 2017/100538 A1 (Global Filtration Systems) describes methods and apparatuses for making multiple 3-dim objects from multiple solidifiable materials. The objects are designed with variable removable support heights along the build axis so that each object has an interface between first and second materials that is the same height from the build platform.

US 2017/0071707 A1 (Uckelmann et al.) relates to a device for manufacturing multi-layered products with individual geometry, the device comprising a substrate plate, a material application device movable relative to the substrate plate and a control device for transmitting signals to the material application device and/or a conveyor device for conveying the substrate plate.

Although existing methods and devices for building up objects provide certain advantages there is still a need for minimizing the time needed for building up multiple objects by additive manufacturing.

SUMMARY OF THE INVENTION

The invention relates to a method of building up at least a first and a second physical workpiece (further referred to as first and second "workpiece") from a light hardenable material on a 3D printing device. The 3D printing device comprises at least a first build platform.

The method comprises the steps of:
providing to the 3D printing device a first dataset for building up a first workpiece;
starting a first print job based on the first dataset, wherein the first print job comprises layerwise printing of the first workpiece on the first build platform in a dimension along a build axis;
providing to the same 3D printing device a second dataset for building up a second workpiece after the start the first print job; and
starting (on the same 3D printing device) a second print job based on the second dataset before finishing the first print job, wherein also the second print job comprises layerwise printing of the second workpiece.

The invention is advantageous in that it allows starting of one or more further print jobs on a 3D printing device that is in the process of building up a first workpiece. Accordingly, the invention allows starting of one or more further print jobs on a 3D printing device on which a first print job was started but not yet finished. Thus, the invention enables a 3D printing device which is normally set up for batchwise processing to be operated in a quasi-continuous manner. The invention is therefore advantageous in that it helps maximizing the throughput of a 3D printing device.

More precisely, the invention allows the printing of multiple parts out of one material and to add during a running print job a new dataset that was not available at the start of the print job. An advantage of this approach is, that new datasets can be added to a printing process without interruption. Thus, in contrast to WO 2017/100538 A1, the invention focusses on a continuous process instead of a concurrently printing approach.

The inventive approach can be supported by the use of an auxiliary base as a placeholder for further objects to be printed. The auxiliary base or placeholder has typically the shape of a volume primitive (such as a cube, cuboid, cylinder or others). The auxiliary base has planar interfaces to the actual build platform and to the support structure of the object to be printed. In comparison to the auxiliary base, the support structure has to be generated after the new geometry occurs and therefore, the support structure is customized for the object to be printed. Therefore, the auxiliary base is printed before the actual support structure and related object to be printed is available.

Alternatively or in addition, the inventive approach can be supported by using a second build platform or even further build platforms, wherein the first and second and optional further build platform(s) move relative to each other between the start of the first and the start of the second print job, and wherein the first and second and optionally further build platforms are moved together upon the start of the second print job.

The method may further comprise the steps of:
providing to the same 3D printing device a third dataset for building up a third workpiece after the start the second print job; and
starting a third print job based on the third dataset before finishing the first and/or second print job, wherein the third print job comprises layerwise printing of the third workpiece.

The method may generally comprise the steps of:
providing to the same 3D printing device one or more further datasets for building up one or more further workpieces after the start of any previously stated print job; and
starting one or more further print jobs based on the one or more further datasets before finishing at least one of the previously stated print jobs, wherein the one or more further print jobs each comprises layerwise printing of the one or more further workpieces.

In one embodiment the first, second and any further workpiece represent portions of one supra-workpiece. In this embodiment building up the supra-workpiece can be started before the entire supra-workpiece is entirely designed. The supra-workpiece can be successively finished as further datasets for further portions of the supra-workpiece become available.

In an embodiment the first, second and any further dataset may are based on a first, second and further computer model, respectively. The first, second and further computer model preferably each represent a shape of the first, second and any further workpiece, respectively. The first, second and any further dataset may further comprise information about a thickness and shape of layers for the layerwise printing.

Preferably the step of starting the first print job is performed at a time at which no second or further dataset is present on the 3D printing device.

In an embodiment the printing is based on successively performing the steps of:
providing a layer of a light hardenable material; and
exposing at least a portion of the layer with light appropriate to cause the light hardenable material to harden.

Preferably the first, second and any further workpiece are built up from the same type of light hardenable material. Further, the printing of the first, second and further workpiece is preferably performed using light hardenable material present within a single vat for holding the light hardenable material.

The wording "light appropriate to cause the light hardenable material to harden" preferably refers to light within the wavelength of between 450 nm to 495 nm (blue light) or light within the wavelength of between 330 nm and 450 nm, preferably 383 nm (UV-light). The light used for the method of the invention can be selected in accordance to the light hardenable material used for printing the first, second or any further workpiece.

In an embodiment the first, second and any further workpiece are printed based on stereolithography such as Digital Light Processing™ (DLP). The method may accordingly comprise the step of providing a 3D printing device that is based on stereolithography (e.g. DLP). The 3D printing device (in addition to the first build platform) preferably has an exposure plate for receiving light hardenable material and a light projector for projecting a light pattern through the exposure plate toward the first build platform. The exposure plate and the first build platform are preferably movable relative to each other in a positional controlled manner. The position of the exposure plate and the first build platform relative to each other, as well as the light pattern are preferably controlled by a computer, based on a computer model of the workpiece to be built up. The exposure plate may be part of a vat in which some light hardenable material may be provided. Further the vat may be provided in addition to the exposure plate. Further the build platform may be formed by a cartridge that is exchangeably retainable in the 3D printing device. The cartridge may comprise a reservoir for storing light hardenable material. The build platform of such a cartridge may be perforated. The light hardenable material stored in the cartridge may be supplied for building up the first (or any further) workpiece through the perforation. Such a cartridge is for example described in WO 2018/026640 A2 (3M).

In a further embodiment the first, second and any further workpiece are printed based on laser irradiation. The skilled person will recognize further techniques for irradiating portions of the light hardenable material.

In an embodiment at least one layer of the light hardenable material is used to harden a portion of the first workpiece and a portion of the second workpiece. This means that at least one layer that is a layer of both, the first and second workpiece, may be hardened at the same time.

In an embodiment the first workpiece comprises a first object and at least a first support structure. Further, the second workpiece preferably comprises a second object and at least a second support structure. Furthermore, any further workpiece preferably comprises a further object and at least a further support structure. The first, second and any further support structure preferably support the first, second and any further object, respectively, during building up. The first, second and any further object each are preferably a dental restoration part, orthodontic bracket, or mold core for a dental restoration part or orthodontic bracket. Preferably the first, second and any further object each have a different shape. In particular the first, second and any further object may have a shape that is customized with respect to a particular tooth of a patient.

In an embodiment the first print job further comprises layerwise printing an auxiliary base at a position laterally of the build axis during printing of the first workpiece. The auxiliary base may be spaced from the first workpiece. Further the auxiliary base may be built up in a dimension parallel to the build axis at a uniform cross-section. The auxiliary base may be built up by layering a plurality of layers having the same cross-section in a plane perpendicular to that dimension. For example, the auxiliary base may have a rectangular or circular cross-section and may accordingly form a cuboid or cylinder, respectively. Any other shape that extends at a uniform cross-section is possible. The volume of the auxiliary base is typically larger than the volume of the support structure. Preferably, the second workpiece is printed on the auxiliary base. The auxiliary base therefore forms a printed auxiliary platform on which a workpiece can be built up at any time. The auxiliary base thus enables that the second workpiece can be started to be built up while the first workpiece is still in the process of being built up.

The first print job may further comprise layerwise printing two or more auxiliary bases at positions laterally of the build axis during printing of the first workpiece. Therefore, further workpieces may each be printed on one of the auxiliary bases. The auxiliary bases thus enable that the further workpieces can be started to be built up while any other workpiece is still in the process of being built up.

In a preferred embodiment the printing of the first workpiece and the printing of the auxiliary base are performed on the first build platform. For example the 3D printing device may have a single build platform and the method of the invention enables that two or more workpieces can be built up timely offset from each other and time-overlapping with each other. For printing a first layer of the first workpiece the first build platform is preferably positioned so that it plunges into light hardenable material present in the vat. For printing a first layer of the second workpiece the first build platform is preferably positioned outside the light hardenable material present in the vat. However, one or more of the auxiliary bases are preferably positioned so that each of them plunge into the light hardenable material present in the vat.

In one embodiment the method comprises the step of suspending the printing of the auxiliary base or bases upon finishing the first print job or upon finishing the last print job still running. This prevents unnecessary building up of only auxiliary bases and helps minimizing the consumption of light hardenable material.

In a further embodiment the second workpiece is printed on a second build platform. In this embodiment the 3D printing device has a first and a second build platform (and optionally further build platforms). The first and second build platform move relative to each other between the start of the first and the start of the second print job. In particular, the first build platform preferably (stepwise) moves during building up the first workpiece and as long as no second dataset is provided to the 3D printing device the second build platform does not move. The first and second build platform are preferably moved together from the start of the second print job. In particular, the first and second build platform preferably (stepwise) move during building up the first and second workpiece. Preferably the first build platform is moved between the start of the first and the start of the second print job. Further the second build platform is coupled to the movement of the first build platform upon the start of the second print job. For example the second build platform may be dragged by the first build platform during building up the second workpiece. In this embodiment for printing a first layer of the first workpiece the first build platform is preferably positioned so that it plunges into light hardenable material present in the vat and for printing a first layer of the second workpiece the second build platform is preferably also positioned so that it plunges into light hardenable material present in the vat. In this embodiment an auxiliary base may is preferably not needed.

In an embodiment the light hardenable material is a photopolymerizable resin comprising a photoinitiator. The hardening is preferably performed by irradiation of the light hardenable material by light. The light hardenable material preferably comprises acyl phosphine oxide (or another phosphine oxide) as a photoinitiator. The light hardenable material is based on monomers with (meth)acrylate moieties as reactive groups. Further the light hardenable material preferably contains fillers, dyes and colorants.

The method may further comprise the step of providing two or more light hardenable materials exhibiting different colors and/or translucencies. This enables the building up of workpieces at non-uniform colors. For example in case the method of the invention is used to build up dental restoration parts, the dental restoration parts may be printed to exhibit a tooth color gradation that resembles the appearance of a natural tooth.

In a further aspect the invention relates to a 3D printing device for building up a physical body from a light hardenable material. The physical body is built up in a dimension along a build axis. The 3D printing device comprises an exposure plate for receiving light hardenable material thereon, and a light projector for projecting a light pattern through the exposure plate. The 3D printing device has a first and a second gripper for releasably holding the physical body. The first and second gripper are movable in a dimension parallel to the build axis. The 3D printing device is configured such that the first and second gripper alternately pull the body away from the exposure plate for building up the physical body. The 3D printing device being preferably configured to perform the method described in the present text.

Preferably the exposure plate has an exposure surface on which the light hardenable material can be received. The exposure surface preferably faces in a direction opposite of the natural force of gravity. Preferably the light projector is arranged beneath the exposure plate (in a direction further toward the center of the Earth). The exposure plate may be formed by a vat for containing the light hardenable material. Further the vat may be used in combination with the exposure plate.

The 3D printing device is configured for building up the body layerwise. The layers are stacked or built onto each other along a build axis. Each layer is created by hardening a portion (or portions) of the light hardenable material, as also disclosed for the method of the invention.

In an embodiment the first and second gripper each have a gripping mechanism for gripping or releasing the body. Further the first and second gripper each may be movable in a dimension laterally of the build axis. Thus each of the first and second gripper can move laterally of the build axis toward the body for gripping the body or laterally of the build axis away from the body for releasing the body.

The first and second gripper during building up the body are typically moved as follows. The first gripper may grip the body and (in a stepwise manner) pull the body away from the exposure plate as successively layers of hardened material are added to the body. Once the first gripper has reached a maximum range over which it can be moved in the dimension parallel to the build axis, the second gripper grips the body at a position between the position of the first gripper and the exposure plate. Subsequently the first gripper releases the body and the second gripper pulls the body away from the exposure plate as successively layers of hardened material are added to the body. Once the second gripper has reached a maximum range over which it can be moved in the dimension parallel to the build axis, the first gripper grips the body at a position between the position of the second gripper and the exposure plate, and so on. This process can be performed in an endless manner.

For initially starting the process a (loose) build platform may be arranged on the exposure plate. Once the process has started further build platforms can be added by building them up from the hardenable material. The built up build platforms may form part of an auxiliary rack at which a first, second or further workpiece can be built up in accordance to the method of the invention.

DETAILED DESCRIPTION OF THE INVENTION

Figure 1:
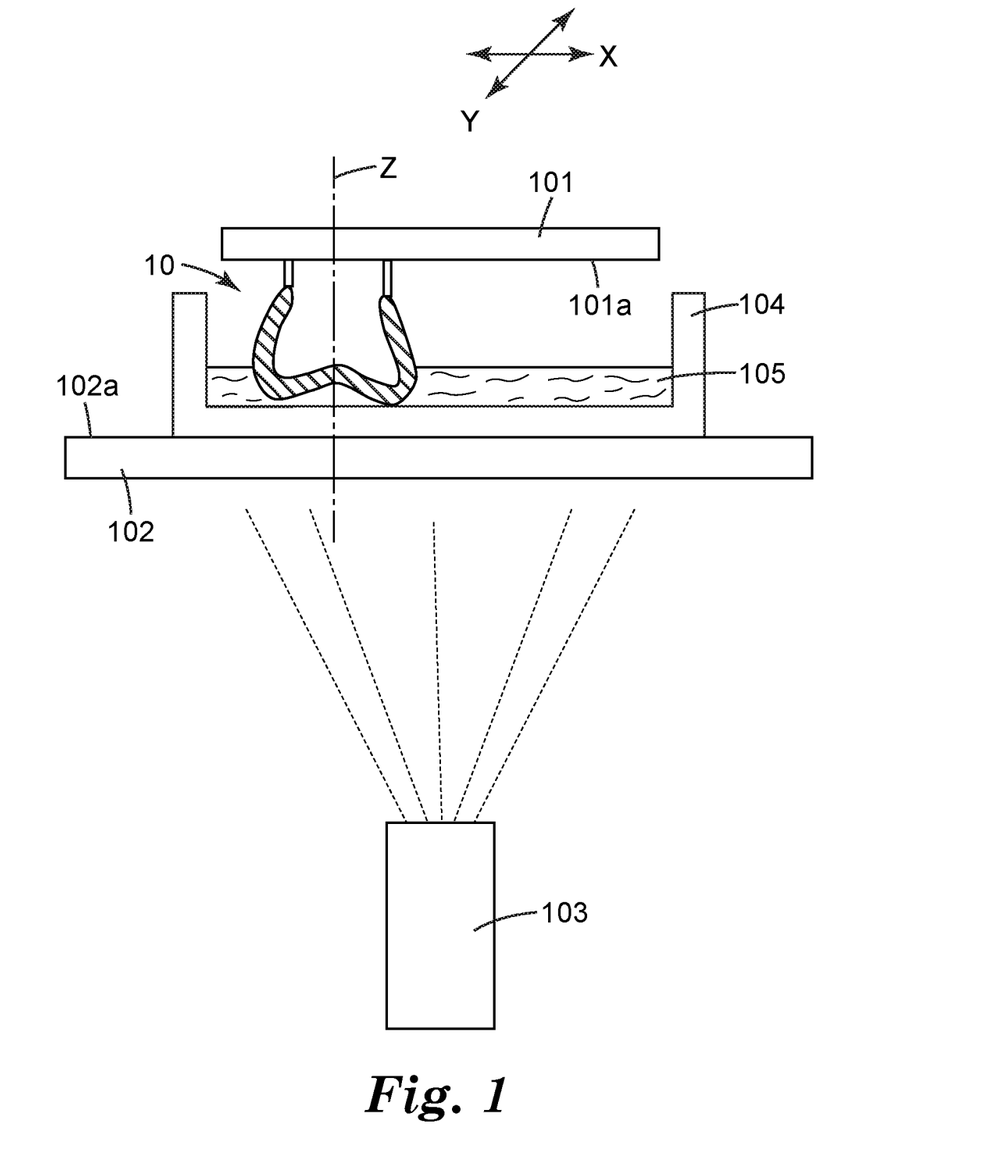
FIG. 1 is a cross-sectional view of a device for performing the method according to the invention.

FIG. 1 illustrates an exemplary 3D printing device 100 for building up a workpiece 10 by additive manufacturing. The device 100 may be used for performing the method of the invention. The device 100 shown is based on the so-called Digital Light Processing (DLP) technique. This technique uses a back-illuminatable light-transmissible exposure plate 102 on which a light hardenable material 105 can be provided, and a build platform 101 that plunges into the light hardenable material 105 and which is movable relative to the exposure plate 102. The method of the invention is not limited to a device using DLP, but may be likewise used with other additive manufacturing devices based on light hardenable materials, as appropriate. In particular other stereolithography devices may be used with the present invention.

The device 100 shown is configured for building up the workpiece 10 in layers of a light hardened material. Each layer is generated in that a gap between the exposure plate 102 and the build platform 101 is provided and liquid hardenable material is provided to fill that gap. Portions of the light hardenable material 105 within that gap are subsequently hardened by exposing these portions to light. The light hardenable material within the gap is particularly irradiated by a two-dimensional light pattern so that those portions of the light hardenable material that are exposed to light in combination form a layer of hardened material shaped in accordance to that pattern.

To create the light pattern the device 100 has a light source 103 which in this example comprises a digital light projector. Further the exposure plate 102 is transparent so that light emitted from the light source passes through the exposure plate 102 and reaches the hardenable material. The exposure plate 102 exhibits an essentially planar exposure surface 102a. The exposure surface 102a is oriented upwards, meaning faces in a direction opposite of the natural force of gravity (away from the center of the Earth).

The light source 103 is arranged underneath the exposure plate 102. In particular, seen from the build platform 101, the digital light projector is arranged behind the exposure plate 102 for projecting light through the exposure plate 102 toward the build platform 101. The digital light projector is configured for projecting light at a two-dimensional pattern. The light pattern may be based on a matrix of a multiplicity of pixels arranged in a regular pattern, for example like a checkerboard. The digital light projector is configured such that each pixel of the pattern can be illuminated or left dark. The resolution of the light pattern adjacent the exposure surface 102a determines the accuracy at which the workpiece can be built up in dimensions parallel to the exposure surface 102a. These dimensions correspond to a first horizontal dimension X and a second horizontal dimension Y that are arranged perpendicular to each other and that are parallel to the exposure surface 102a. (In the Figure the second horizontal dimension Y is indicated in a perspective view for illustrative purposes only, although the second horizontal dimension Y is actually arranged perpendicular to the plane of the Figure.) The control of the light pattern may be provided by a so-called Digital Micro-mirror Device (DMD). The DMD comprises a multiplicity of individually rotatable small mirrors which can be oriented for deflecting light from a light beam toward the exposure plate to generate a light pixel or away from the exposure plate to generate a dark pixel. The skilled person will recognize other techniques for light projection. For example, the projector may be based on the LCD (Liquid Crystal Display) projection technique. The light pattern may further be based on a movable light beam, for example a laser beam. In this technique the pattern may or may not be based on a matrix of pixels.

The light beam used for the light projection comprises light in a wavelength range that is required or suitable for hardening the light hardenable material, in the example UV-light within a wavelength range of about 330 nm to about 450 nm, and in particular 383 nm.

After hardening, the layer of hardened material is moved (pulled) away from the exposure plate 102 so as to create a new gap in which further light hardenable material flows, and so on.

In the example the hardenable material 105 is provided in a vat 104. The vat 104 is transparent so that light emitted from the light source passes through the exposure plate 102, through the vat 104 and finally reaches the hardenable material 105. The skilled person will recognize that the vat 104 is optional although it is of advantage, for example, for building up several workpieces from different materials without the need of cleaning the exposure plate 102 in between.

The workpiece 10 is built up by providing (or "stacking") a multiplicity of layers in sequence. The dimension along which the layers are stacked is referred to as "build axis" (referred to as "Z" in the Figure). The build axis Z in the example further corresponds to a vertical dimension that is perpendicular to the first and second horizontal dimension X, Y. The build platform 101 is movable relative to the exposure plate 102 along the build axis Z. The build platform 101 has a build surface 101a that faces the exposure surface 102a. The device 100 is configured such that the build surface 101a and the exposure surface 102a can be positioned relative to each other by computer control. In particular, the distance between the build surface 101a and the exposure surface 102a relative to each other can be controlled by the computer. The build platform 101 (with the build surface 101a) is movable vertically, for example by means of a motor drivable linear guide. The build platform 101 may for example be mounted in a commercially available 3D printer that is based on the Digital Light Projection (DLP) technique.

The layers typically have the same or a pre-determined uniform thickness (i.e. in the Z dimension) but can be individually two-dimensionally shaped in dimensions laterally to the thickness (i.e. in the first and second horizontal dimension X, Y) based on different light patterns. It is however possible to build up a workpiece by providing a multiplicity of layers having different thicknesses. Therefore three-dimensional workpieces of a great variety of different shapes can be built up with this technique.

The accuracy of the workpiece 10 along the build axis Z is generally determined by the precision at which the build surface 101a and the exposure surface 102a can be positioned relative to each other.

Figure 2:
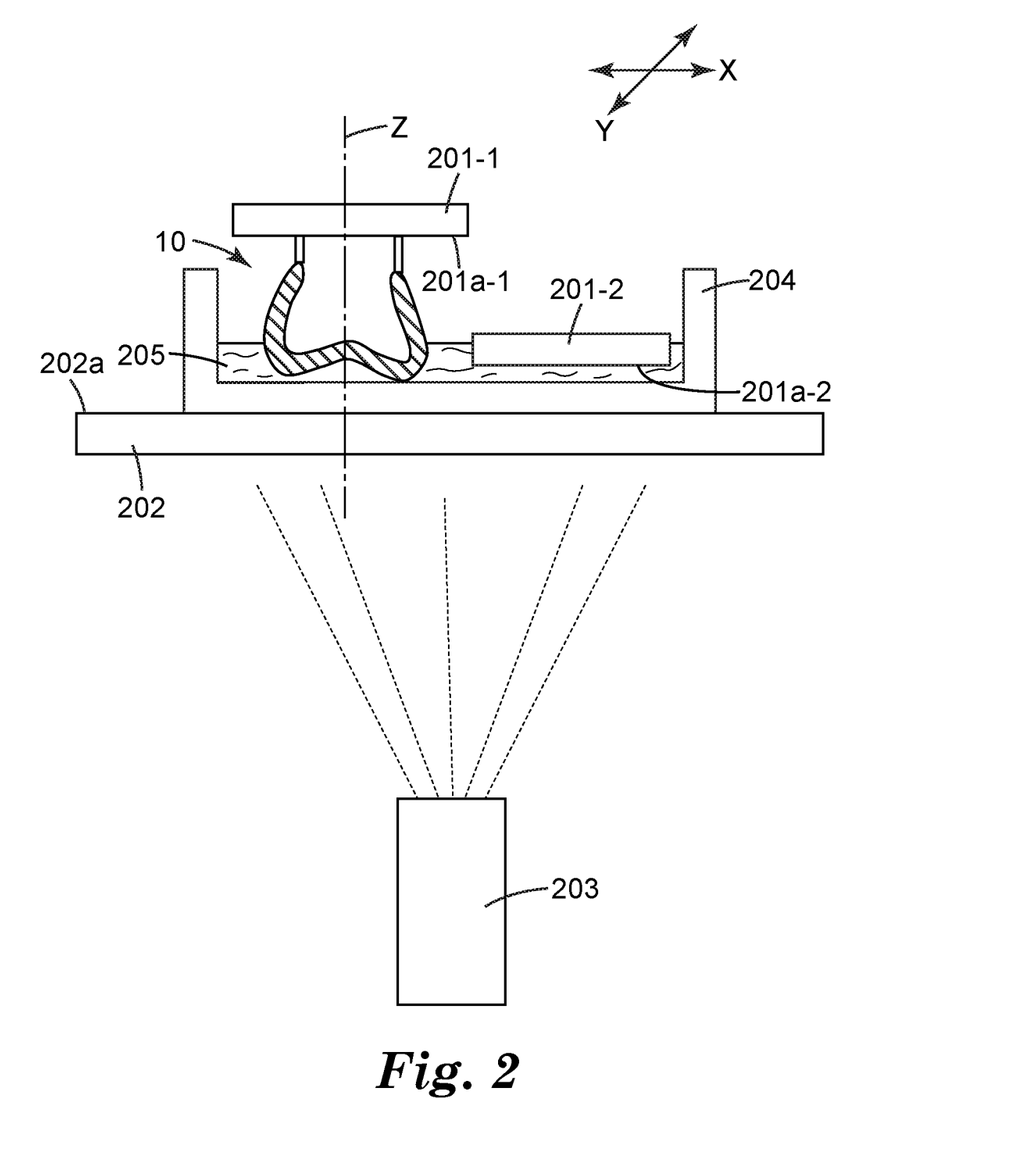
FIG. 2 is a cross-sectional view of an alternative device for performing the method according to the invention.

FIG. 2 shows a device 200 which is identical to the device shown in FIG. 1 except that instead of one build platform the device 200 has a first build platform 201-1 and a second build platform 201-2. The first build platform 201-1 and the second build platform 201-2 have a first build surface 201a-1 and a second build surface 201a-2, respectively. The device 200 has further an exposure plate 202 with an exposure surface 202a, a light source 203 that comprises a digital light projector, a vat 204 in which light hardenable material can be provided. The device 200 may have further build platforms as appropriate. The first and second build platform 201-1/2 are movable independently from each other. In particular the second build platform 201-2 can be either uncoupled from the first build platform 201-1 or coupled with the first build platform 201-1. If the second build platform 201-2 is uncoupled from the first build platform 201-1 the second build platform 201-2 does not move although the first build platform 201-1 may move. If the second build platform 201-2 is coupled with the first build platform 201-1 the second build platform 201-2 moves with any movement of the first build platform 201-1.

Figure 3:
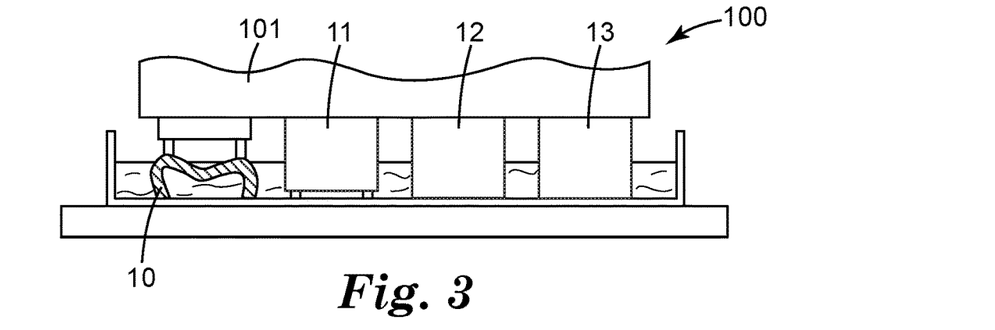
FIGS. 3-5 are cross-sectional views illustrating an embodiment of the method of the invention.
Figure 4:
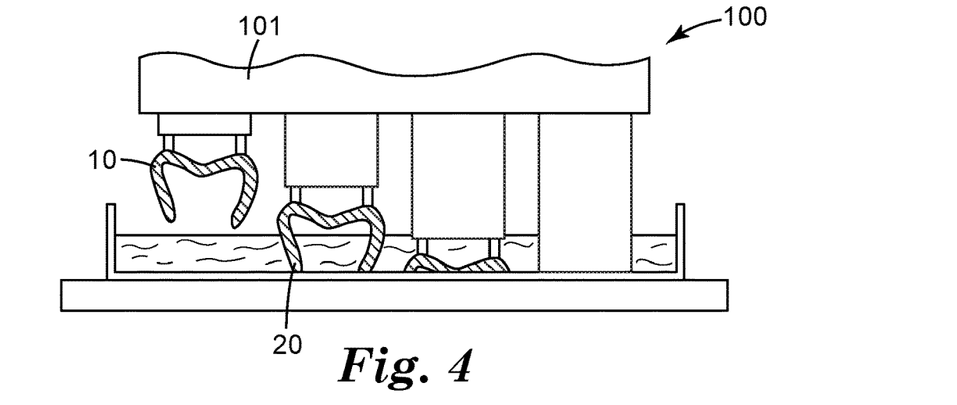

FIGS. 3, 4 and 5 illustrate a preferred method of the invention in which a device 100 in accordance to FIG. 1 is used. FIG. 3 illustrates a first workpiece 10 which is in the process of being built up (e.g. printed) from light hardenable material. The first workpiece 10 is retained on the build platform 101. The printing of the first workpiece 10 is performed as a first print job that is based on a first dataset that was provided to the 3D printing device prior to or with the start of first print job. The first print job comprises layerwise printing of the workpiece 10 on the first build platform in a dimension along a build axis Z. In addition the first print job comprises layerwise printing of (in the example three) auxiliary bases 11, 12, 13. The auxiliary bases 11, 12, 13 are printed at positions laterally of the build axis Z. As illustrated the workpiece 10 and the auxiliary bases 11, 12, 13 are laterally spaced from each other. The auxiliary bases 11, 12, 13 have a predetermined standardized shape, for example a cylindrical shape. The auxiliary bases 11 are incrementally built up, preferably at a uniform cross-section, until a second print job is provided to the 3D printing device 100. As illustrated in FIG. 4. A second workpiece 20 is started to be printed based on the second dataset on the auxiliary structure 11 after the printing of the first workpiece 10 was started and although the printing of the first workpiece 10 is not yet finished. This is enabled because the auxiliary structures 11, 12, 13 are printed in parallel with the first workpiece 10 and therefore are available for printing a further workpiece thereon at that stage without interrupting or ending the first print job. The second print job comprises printing the second workpiece on the same 3D printing device 100 while printing the first workpiece is still in progress.

Figure 5:
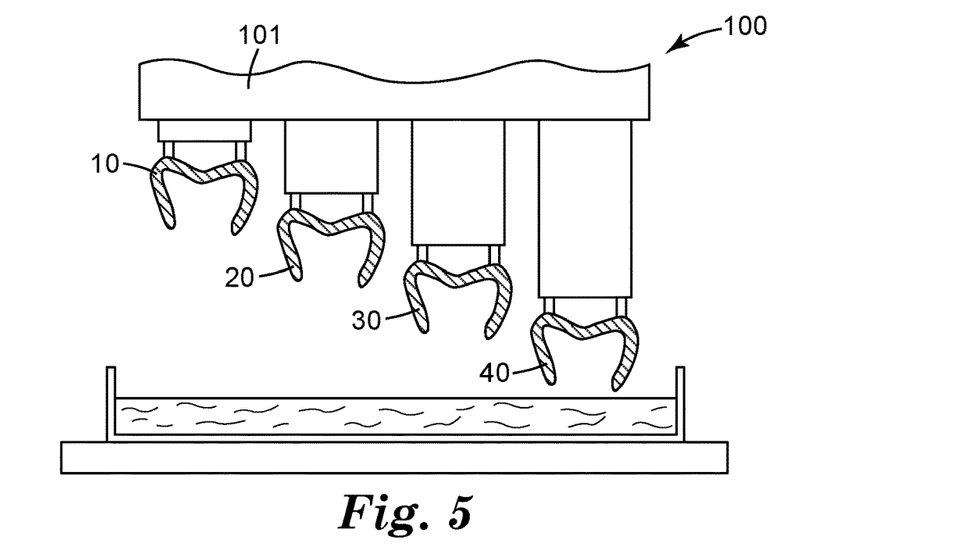

FIG. 5 illustrates the first and the second workpiece 10, 20 as well as a third and a fourth workpiece 30, 40 when they are finished. Each of the second, third and fourth workpiece 20, 30, 40 were started to be printed while printing of at least one of the first, second, third and/or fourth workpiece 10, 20, 30, 40 was still in progress.

Figure 6:
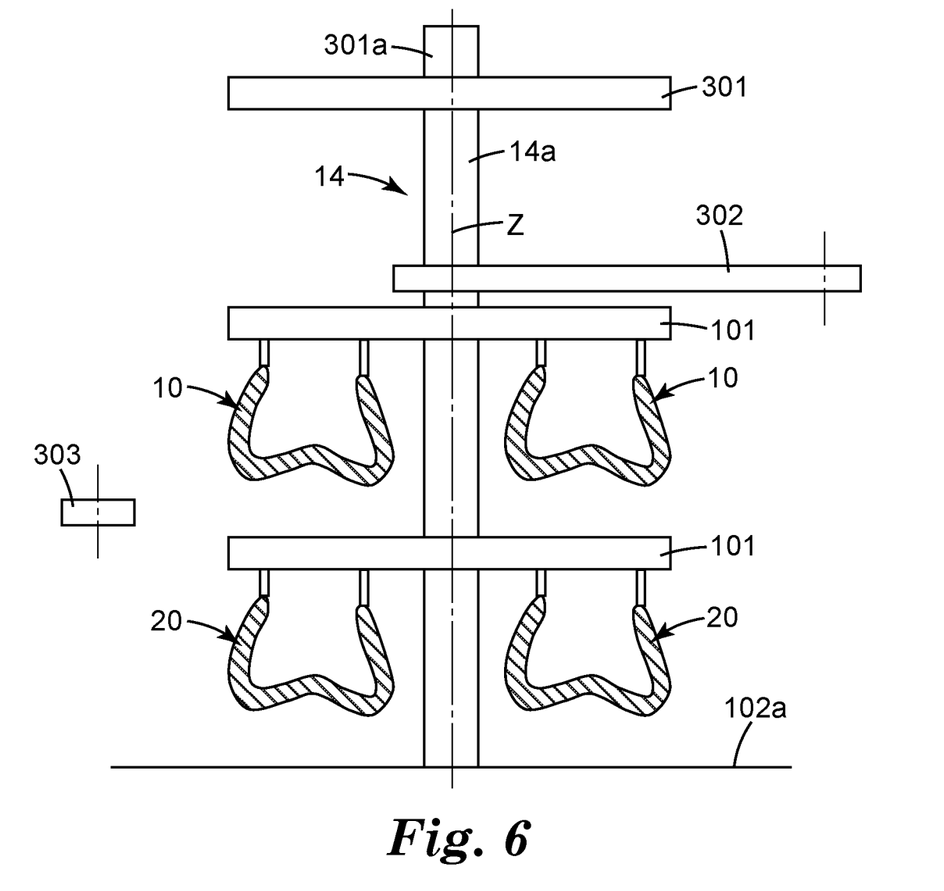
FIGS. 6-8 are cross-sectional views illustrating a further embodiment of the method of the invention.
Figure 7:
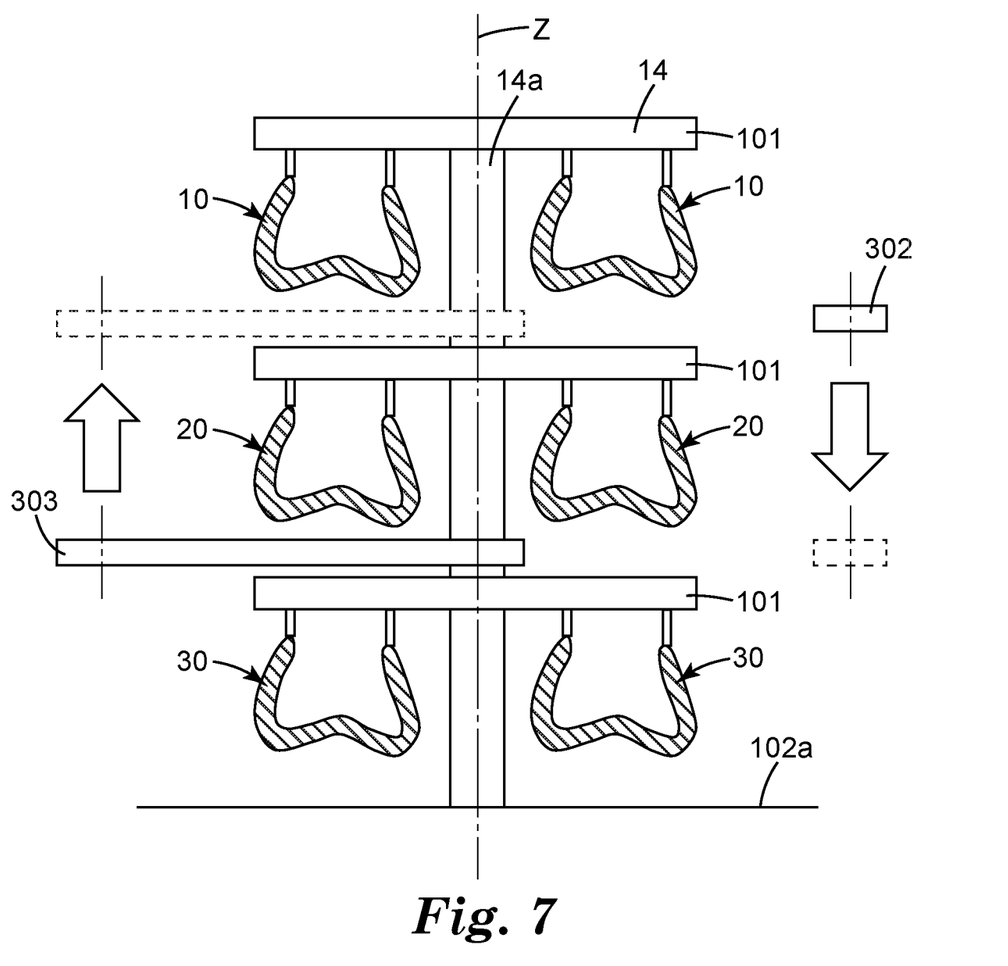
Figure 8:
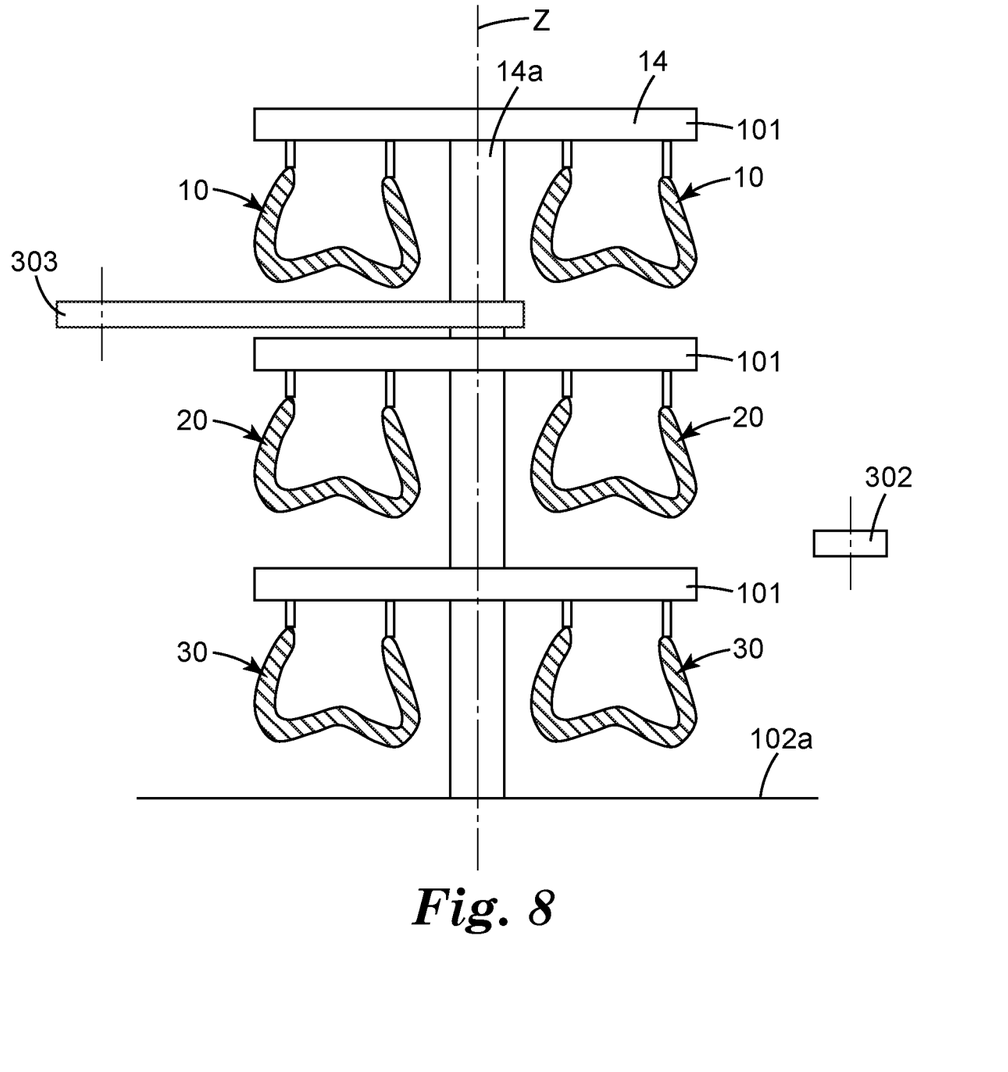

FIGS. 6, 7 and 8 illustrate a method of the invention in which first, second and further workpieces 10, 20, 30 are built up in a continuous process. The first, second and further workpieces 10, 20, 30 are particularly built up together with an auxiliary rack 14 by which the first, second and further workpieces 10, 20, 30 are suspended. The first, second and further workpieces 10, 20, 30 may be of the same or different shape. In the example the first, second and further workpieces 10, 20, 30 comprise different dental restorations. In this example multiple build platforms 101 are provided by the auxiliary rack 14. This means that the build platforms are not provided as part of the 3D printing device but built up from the light hardenable material.

FIG. 6 illustrates the continuous process short after an initial stage. At that stage an initial build platform 301 is provided in the form of a lose component, for example in the form of a (preferably disposable) disc made of thermoplastic material or any other appropriate material. The initial build platform 301 is initially placed directly on the exposure surface 102a and used to build up a support post 14a of the auxiliary rack 14. The support post 14a is used to pull the auxiliary rack 14 along the build axis Z during building up further portions of the auxiliary rack 14 and the first and second workpieces 10, 20. For building up an initial portion of the support post 14a the initial build platform 301 has a post 301a that may be gripped by the 3D printing device for pulling the initial build platform 301 along the build axis Z.

At the stage shown in FIG. 6 a first gripper 302 grips and holds the auxiliary rack 14 at the support rack. For building up a further portion of the support rack 14 and further workpieces the first gripper 302 can pull the support rack along the build axis Z. Accordingly the first gripper is movable in a dimension of the build axis Z over a travel range. Once the first gripper 302 has reached the end of the travel range a second gripper 303 grips the support post 14 at a position further offset toward the exposure surface 102a relative to the position of the first gripper 302, as illustrated in FIG. 7. After the second gripper 303 grips and holds the auxiliary rack 14 at the support post 14a, the first gripper 302 releases the auxiliary rack 14. As indicated by the arrows in FIG. 7 the second gripper can be used to pull the auxiliary rack along the build axis Z away from the exposure surface 102a for building up further portions of the auxiliary rack and further workpieces. Further the first gripper 302 can be moved toward the exposure surface 102a. The resulting positions of the first and second gripper 302, 303 are shown in FIG. 8. At that stage the second gripper 303 has reached the end of the travel range. As one of the next steps the first gripper 302 grips the support post 14a of the support rack 14 after which the second gripper 303 releases the support post 14a of the support rack 14. From there the process continues as described in FIG. 6 and so on.

The printing of the first workpieces 10 is performed as a first print job that is based on a first dataset that was provided to the 3D printing device prior to or with the start of first print job. The first print job comprises layerwise printing of the workpieces 10 on the build platform 101 of the auxiliary rack 14 in a dimension along a build axis Z. The second workpieces 20 are started to be printed based on a second dataset that was provided only after the printing of the first workpieces 10 had started and although the printing of the first workpieces 10 was not yet finished. Further workpieces 30 are started to be printed based on a further datasets provided only after the printing of any workpieces had started, and so on. The build platform 101 may be built up at a geometry providing an appropriate support relative to the auxiliary rack 14. For example the build platform 101 may have a conical surface on a side that faces away from the light pattern. Thus the build platform 101 can be built up by gradually increasing the size of the build platform in dimensions laterally of the build axis Z.

Accordingly with this embodiment of the method the auxiliary rack 14 with the workpieces suspended thereon can be endlessly built up or "grown" on the exposure surface 102a. Any workpieces can be removed (or "harvested") from the 3D printing device by cutting off that end portion of the auxiliary rack 14 that is located opposite of the exposure surface 102a. This process can be performed by continuously "growing and harvesting" the auxiliary rack 14 and the workpieces.

What is claimed is:

1. A method of building up at least a first and a second physical workpiece from a first light hardenable material on a 3D printing device that comprises at least a first build platform, the method comprising the steps of:
   providing to the 3D printing device a first dataset for building up a first workpiece, the first workpiece comprising a first object and a first support structure, the first support structure supporting the first object during building up;
   starting a first print job based on the first dataset, wherein the first print job comprises layerwise printing of the first workpiece from the first light hardenable material on the first build platform in a dimension along a build axis, wherein the first print job further comprises layerwise printing an auxiliary base at a position laterally of the build axis during printing of the first workpiece;
   providing to the 3D printing device a second dataset for building up a second workpiece after the start of the first print job, the second workpiece comprising a second object and a second support structure, the second support structure supporting the second object during building up and including a planar interface to the auxiliary base; and
   starting a second print job based on the second dataset before finishing the first print job, wherein the second print job comprises layerwise printing of the second workpiece from the first light hardenable material.

2. The method of claim 1, wherein the printing is based on successively performing the steps of:
   providing a layer of first light hardenable material on an exposure surface; and
   exposing at least a portion of the layer with light appropriate to cause the first light hardenable material to harden.

3. The method of claim 2, wherein the first and second workpiece are printed based on stereolithography or laser irradiation.

4. The method of claim 2, wherein at least one layer of the first light hardenable material is used to harden a portion of the first workpiece and a portion of the second workpiece.

5. The method of claim 1, wherein the second support structure connects the second object to the auxiliary base, the second support structure being printed after the auxiliary base.

6. The method of claim 1, wherein the first and second object are a dental restoration parts, orthodontic brackets, or mold cores for dental restoration parts or orthodontic brackets.

7. The method of claim 6, wherein the first and second object have a different shape.

8. The method of claim 1, wherein the printing of the first workpiece and the printing of the auxiliary base are performed on the first build platform.

9. The method of claim 1, wherein the second workpiece is printed on a second build platform, wherein the first and second build platform move relative to each other between the start of the first print job and the start of the second print job, and wherein the first and second build platform are moved together upon the start of the second print job.

10. The method of claim 9, wherein the first build platform is moved between the start of the first print job and the start of the second print job, and wherein the second build platform is coupled to a movement of the first build platform upon the start of the second print job.

11. The method of claim 1, wherein the first light hardenable material is a photopolymerizable resin comprising a photoinitiator, and wherein the hardening is performed by irradiation of the light hardenable material by light.

12. The method of claim 11, wherein the first light hardenable material comprises acyl phosphine oxide as a photoinitiator.

13. The method of claim 11, wherein the first light hardenable material is based on monomers with (meth) acrylate moieties as reactive groups, and wherein the light hardenable material contains fillers, dyes and colorants.

14. The method of claim 1, wherein the auxiliary base includes a predetermined shape and a planar interface to the first build platform.

15. The method of claim 1, wherein the auxiliary base is a first auxiliary base printed, and wherein the second print job further comprises layerwise printing a second auxiliary base.

16. The method of claim 15, wherein the second auxiliary base further includes a planar interface to a third support structure.

17. The method of claim 16, further comprising:
   providing to the 3D printing device a third dataset for building up a third workpiece after the start of the second print job, the third workpiece comprising a third object and the third support structure.

* * * * *